UNITED STATES PATENT OFFICE.

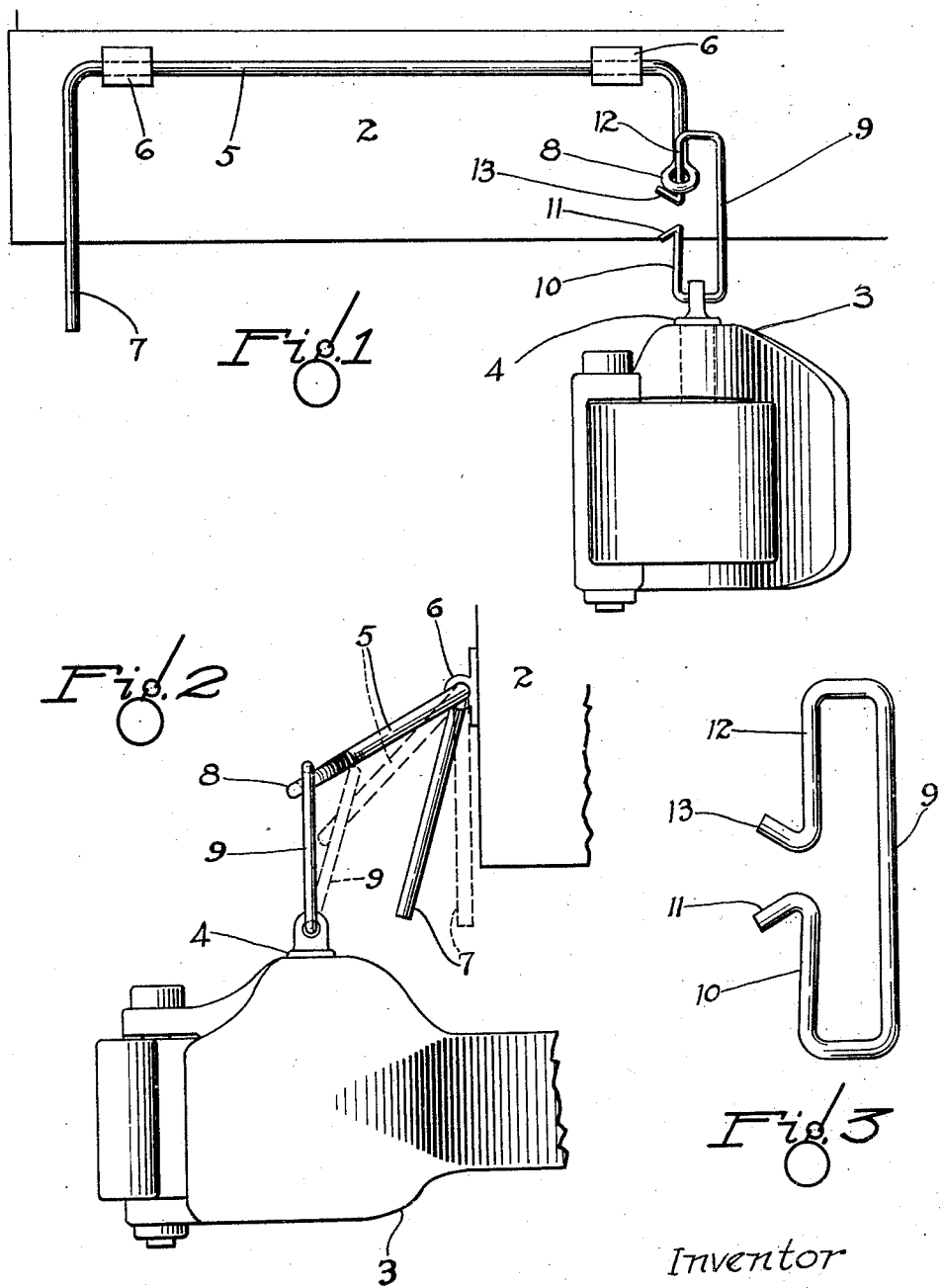

JOHN R. SCOTT, OF MINNEAPOLIS, MINNESOTA.

UNCOUPLING DEVICE FOR CAR COUPLINGS.

1,408,833.

Specification of Letters Patent.   Patented Mar. 7, 1922.

Application filed December 18, 1920.   Serial No. 431,634.

*To all whom it may concern:*

Be it known that I, JOHN R. SCOTT, a citizen of the United States, resident of Minneapolis, county of Hennepin, State of Minnesota, have invented certain new and useful Improvements in Uncoupling Devices for Car Couplings, of which the following is a specification.

The object of my invention is to provide a connection between the coupling pin and the operating lever which will eliminate entirely the objectionable and now condemned chain connection while having all the functions of the chain in allowing freedom of movement of the coupling and the cars without danger of breaking any of the parts.

A further object is to provide a connection which besides embodying the flexible feature of a chain, has none of the dangers incidental to the use of a chain, namely, the cramping or kinking of the links and the subsequent bending and breaking of the parts connected therewith.

A further object is to provide a connection which will comply strictly with the Federal laws relating to the equipment of freight cars and particularly the couplings therefor and at the same time will be simple and thoroughly practical in construction, easily operated and more durable than devices of this kind as heretofore employed.

My invention consists generally in a single continuous connection between the coupling pin and the operating lever which will allow freedom of movement of the coupler when the cars are in motion.

In the accompanying drawings forming part of this specification,

Figure 1 is a view of a portion of the end wall of a freight car and the draw bar, showing my improved connection between the coupling pin and the operating lever, Figure 2 illustrates the distance the lever may move from its normal position before it applies strain to the link and coupling pin, Figure 3 is a detail view of the link detached from the pin and lever.

In the drawing, 2 represents the end wall of the car, 3 the draw bar and 4 the coupling pin and 5 the operating lever, all of the ordinary well known construction, the lever being mounted on the end timber of the car in suitable bearings 6 and provided with a handle 7 for rocking the lever on its longitudinal axis to uncouple the coupling. For many years chains have been used to connect the coupling pin with the lever, with clevises at the ends of the chain for connection with an eye in the pin and a similar eye in the end of the lever. It was thought necessary to use chains to provide the desired flexibility and allow the coupling to rise and fall and sway from side to side with the motion of the draw bar. Evidently a rigid connection between these two parts would soon be broken when the train was in motion. It has been found, however, that chains, even those of great strength, were not suitable, as the motion of the train frequently causes the links of the chain to slide one upon the other and become kinked or cramped in such a position that when a quick, strong jerk was applied thereto, resulting from a sudden tilt or sway of the coupler, the clevises connecting the chain with the link or lever would be broken or sometimes one of the links would part and it would then be impossible to unlock the coupling through the operation of the lever. This breakage of the chain and the clevises occurred so frequently that Federal laws are now in force requiring all railroads to remove chains from the couplings and substitute therefor a single continuous connection. Evidently, an ordinary link of sufficient strength to withstand the pull of the lever in uncoupling the coupling would not be flexible and allow for the sway and tilt of the car.

To provide for such movement without damage to the connections, I form a horizontal eye 8 in the end of the lever and then provide a link 9 open on one side, having one end 10 adapted for insertion through the eye of the coupling pin and terminating in a downwardly bent extremity 11, while the other end of the link has a part 12 and an extremity 13 that is inserted through a horizontal eye 8 of the operating lever. The part 12, while formed substantially like the part 10 at the other end of the link, is preferably shorter, there being usually in practice about three inches between the bend at the end of the link and the extremity 13. This distance represents the play or freedom of movement that the eye 8 has on the link. Normally this eye will be near the extremity 13, as indicated in Figure 1, and consequently the coupling may be moved up and down and swung forward and back or to either side, the link sliding in the eye and permitting such freedom of movement and still forming the desired continuous unbroken connection between the pin and the operating lever. Furthermore, when it is desired to uncouple the coupling, the play or lost motion of the lever before the eye begins to lift on the link, allows the operator to obtain sufficient momentum or impetus to the lever so that the coupling pin may be readily removed under all conditions. This lost motion or play of the lever with its eye sliding on the link, as it does, produces the same result that this device with the slack of a chain would in a flexible connection, and of course the free movement of the link up and down in the eye of the lever permits the coupling to follow the swaying and tilting of the car without any possibility of cramping or binding the connections at any point between the pin and the operating lever. The ends of the link are so formed that they can be easily inserted into the eyes of the pin and lever while the angle of the extremities is such that accidental separation is impossible, it being necessary to turn the link to a substantially horizontal position before the parts can be disengaged.

I may prefer to make the link, as shown, a little narrower at the middle than at the ends, by pressing the end portions slightly toward the opposite bar of the link, as indicated in the drawing.

This coupling device is evidently applicable to any car where an operating lever is used, and will embody all the flexible advantages of a chain with none of its objectionable features.

I claim as my invention:

1. In combination with a coupling lock and operating lever having eyes, a link having a gap in one of its side bars, one of the ends of one of the side bars on one side of the gap being outwardly bent at an angle to the bar and being of a size smaller than the eye of the operating lever to permit the same to be inserted therethrough, and the other end of said side bar being provided with a stop to prevent its accidental detachment from the eye of the lock.

2. In combination with a coupling lock and operating lever having eyes, a single link connection between them comprising a link having a gap in one of its side bars, one of the ends of the bar having the gap being provided on one side of the gap with an outwardly projecting extension, of a size to permit its insertion through the eye of the coupling lock, and the other end of said side bar being provided with a stop to prevent its accidental detachment from the eye of the lever.

3. The combination with a coupling lock and operating lever having eyes, of a single link connecting said lever and lock and consisting of a one-piece rod having its end portions bent and extending toward each other in the form of short legs, said legs being spaced apart and one leg being provided with an angularly projecting extension of a size in cross-section smaller than the eye of the lever to permit its insertion into the last mentioned eye, and the other leg being provided with a stop to prevent its accidental detachment from the eye of the lock.

4. In combination, with a coupling lock and operating lever, a single inflexible connection between them, comprising a link having a gap in one of its side bars, the ends of the bar on opposite sides of the gap being outwardly bent at an angle to the bar and said lever having an eye to receive the end of the bar, said link being free to slide in said eye and said lever being free to move on said bar between the angled end thereof and the end of the link.

5. A link for use in car couplings comprising a rod having its end portions bended to provide opposite legs which extend towards each other and are provided at their ends with angularly projecting extensions which are spaced apart.

6. In combination with a coupling lock and an operating lever, each having an eye, a link connecting said lever and coupling lock, said link having one of its sides divided into upper and lower portions by a gap, both portions of the link on opposite sides of the gap having a stop thereon, that portion of the link between the upper stop and the upper end of the link passing through the lever eye and the eye being freely movable thereon.

7. A combination of the kind defined by claim 6 in which the stops on the link are outwardly bent portions which serve to prevent the accidental detachment of the link from the eye of the lever or the eye of the lock when the parts are assembled in their normal position.

8. In combination with a coupling lock, and an operating lever, each having an eye, a connection between them comprising a link having a gap in one of its side bars, the ends of the bar on opposite sides of the gap being both capable of threading through said eyes when the operating lever is detached or the lock is withdrawn, but having stops to prevent detachment when the lever is held in normal position and the lock is in locking position, said link being free to slide in said lever eye and said lever being free to move on said bar between said stop and the end of the link.

In witness whereof, I have hereunto set my hand this 14th day of December 1920.

JOHN R. SCOTT.